US009402187B2

(12) United States Patent
Lunden et al.

(10) Patent No.: US 9,402,187 B2
(45) Date of Patent: Jul. 26, 2016

(54) APPARATUS, METHOD, COMPUTER PROGRAM FOR COMMUNICATION AND SYSTEM THEREOF

(75) Inventors: Jari Petteri Lunden, Espoo (FI); Elena Virtej, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 874 days.

(21) Appl. No.: 13/378,310

(22) PCT Filed: Jun. 30, 2009

(86) PCT No.: PCT/FI2009/050595
§ 371 (c)(1),
(2), (4) Date: Dec. 14, 2011

(87) PCT Pub. No.: WO2011/001004
PCT Pub. Date: Jan. 6, 2011

(65) Prior Publication Data
US 2012/0094610 A1 Apr. 19, 2012

(51) Int. Cl.
H04W 24/00 (2009.01)
H04W 16/14 (2009.01)
H04B 17/345 (2015.01)

(52) U.S. Cl.
CPC .............. *H04W 16/14* (2013.01); *H04B 17/345* (2015.01)

(58) Field of Classification Search
CPC ......... H04W 72/04; H04B 17/00; H04B 1/00; H04B 15/00; H04B 7/00; H04H 20/71
USPC .............. 455/13, 11, 14, 114.2, 115.1, 115.2, 455/115.3
See application file for complete search history.

(56) References Cited

U.S. PATENT DOCUMENTS 7,590,171 B2 * 9/2009 Chang et al. ................. 375/227
7,725,079 B2 * 5/2010 Kim ..................... H04B 1/17103
455/114.2

(Continued)

FOREIGN PATENT DOCUMENTS

WO 97/24816 A2 7/1997

OTHER PUBLICATIONS

U.S. Appl. No. 61/198,341, "Priority Based Technique to Achieve Fairness for Radio Resource Sharing", filed Nov. 5, 2008, 20 pages.

(Continued)

*Primary Examiner* — Edward Urban
*Assistant Examiner* — Ralph H Justus
(74) *Attorney, Agent, or Firm* — Squire Patton Boggs (US) LLP

(57) ABSTRACT

The invention is related to a method comprising: receiving a beacon signal from at least one transmitter; measuring total received interference power; determining strength of the received at least one beacon signal; determining at least one offset value by using the information the at least one beacon signal comprises; generating estimates of received interference power values transmitter-wise by using the determined at least one offset value and the determined strength of the received at least one beacon signal; combining the transmitter-wise estimated received interference power values for obtaining an estimated total received interference power; and subtracting the estimated total received interference power from the measured total received interference power for obtaining a residual interference power, the residual interference power originating from uncooperative devices.

17 Claims, 3 Drawing Sheets

(56) References Cited

U.S. PATENT DOCUMENTS

Figure 1:
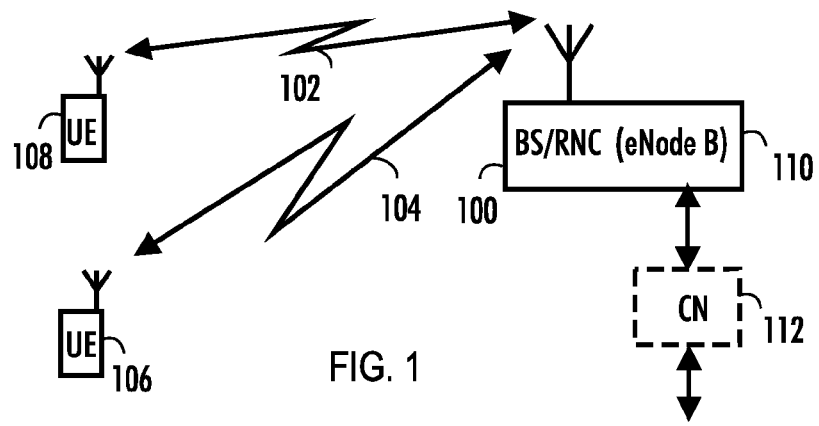

| | | | |
|---|---|---|---|
| 7,818,018 B2* | 10/2010 | Nanda et al. | 455/509 |
| 8,184,653 B2* | 5/2012 | Dain | H04W 16/14 370/431 |
| 8,433,349 B2* | 4/2013 | Jovicic | H04W 52/34 375/148 |
| 8,514,771 B2* | 8/2013 | Das et al. | 370/318 |
| 2002/0002052 A1 | 1/2002 | McHenry | |
| 2006/0025115 A1 | 2/2006 | Roy | |
| 2006/0084390 A1* | 4/2006 | Salonaho | H04W 36/30 455/67.11 |
| 2007/0042784 A1* | 2/2007 | Anderson | H04W 52/34 455/450 |
| 2008/0075059 A1* | 3/2008 | Kermoal et al. | 370/343 |
| 2008/0261645 A1* | 10/2008 | Luo et al. | 455/522 |
| 2009/0047920 A1* | 2/2009 | Livsics | H04B 1/719 455/226.1 |
| 2009/0124206 A1* | 5/2009 | Kwon et al. | 455/63.1 |
| 2009/0264080 A1* | 10/2009 | Huang et al. | 455/67.13 |
| 2009/0298439 A1* | 12/2009 | Choi | H04W 72/02 455/67.11 |
| 2010/0048151 A1* | 2/2010 | Hara | 455/115.1 |
| 2010/0075704 A1* | 3/2010 | McHenry | H04W 16/14 455/509 |
| 2010/0110886 A1 | 5/2010 | Sorri et al. | |
| 2010/0157910 A1* | 6/2010 | Nentwig et al. | 370/329 |
| 2010/0216481 A1* | 8/2010 | Gormley | 455/450 |

OTHER PUBLICATIONS

U.S. Appl. No. 61/198,316, "Uplink Interference Signalling in Flexible Spectrum Use System", filed Nov. 5, 2008, 14 pages.

International Search Report and Written Opinion received for corresponding Patent Cooperation Treaty Application No. PCT/FI2009/050595, dated Mar. 30, 2010, 14 pages.

* cited by examiner

US 9,402,187 B2

APPARATUS, METHOD, COMPUTER PROGRAM FOR COMMUNICATION AND SYSTEM THEREOF

RELATED APPLICATION

This application was originally filed as PCT Application No. PCT/FI2009/050595 filed Jun. 30, 2009.

FIELD

The invention relates to an apparatus, method, computer program for communication and a communication system.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Flexible Spectrum Use (FSU) has been envisioned as one of key features of future communication networks. Independent radio systems, such as military radars, broadcasters, cellular radio systems, and/or independent operators or users may share the same radio spectrum. In future communication networks, devices are able to use the spectrum in an intelligent self-organizing flexible manner by adapting their operation to the current situation by sensing the environment or based on pre-defined resource sharing policies, for instance. FSU can be a useful scheme especially for local and personal area wireless systems.

BRIEF DESCRIPTION

According to an aspect of the present invention, there is provided an apparatus comprising: at least one processor; and at least one memory including computer program code, the at least one memory and the computer program code configured to, with the at least one processor, cause the apparatus at least to perform: receive a beacon signal from at least one transmitter; measure total received interference power; determine strength of the received at least one beacon signal; determine at least one offset value by using the information the at least one beacon signal comprises; generate estimates of received interference power values transmitter-wise by using the determined at least one offset value and the determined strength of the received at least one beacon signal; combine the transmitter-wise estimated received interference power values for obtaining an estimated total received interference power; and subtract the estimated total received interference power from the measured total received interference power for obtaining a residual interference power, the residual interference power originating from uncooperative devices.

According to another aspect of the present invention, there is provided a method comprising: receiving a beacon signal from at least one transmitter; measuring total received interference power; determining strength of the received at least one beacon signal; determining at least one offset value by using the information the at least one beacon signal comprises; generating estimates of received interference power values transmitter-wise by using the determined at least one offset value and the determined strength of the received at least one beacon signal; combining the transmitter-wise estimated received interference power values for obtaining an estimated total received interference power; and subtracting the estimated total received interference power from the measured total received interference power for obtaining a residual interference power, the residual interference power originating from uncooperative devices.

According to another aspect of the present invention, there is provided a computer program embodied on a computer readable medium, configured to control a processor to perform a method, the method comprising: receiving a beacon signal from at least one transmitter; measuring total received interference power; determining strength of the received at least one beacon signal; determining at least one offset value by using the information the at least one beacon signal comprises; generating estimates of received interference power values transmitter-wise by using the determined at least one offset value and the determined strength of the received at least one beacon signal; combining the transmitter-wise estimated received interference power values for obtaining an estimated total received interference power; and subtracting the estimated total received interference power from the measured total received interference power for obtaining a residual interference power, the residual interference power originating from uncooperative devices.

According to another aspect of the present invention, there is provided a system comprising: at least one access point configured to transmit a beacon signal; at least one user device configured to: receive a beacon signal from at least one transmitter; measure total received interference power; determine strength of the received at least one beacon signal; determining at least one offset value by using the information the at least one beacon signal comprises; generate estimates of received interference power values transmitter-wise by using the determined at least one offset value and the determined strength of the received at least one beacon signal; combine the transmitter-wise estimated received interference power values for obtaining an estimated total received interference power; and subtract the estimated total received interference power from the measured total received interference power for obtaining a residual interference power, the residual interference power originating from uncooperative devices.

Embodiments of the invention provide a plurality of advantages. Embodiments provide an option to differentiate interference originating from FSU transmitters from interference originating from uncooperative systems. This information may be used in decision making on how to proceed in interference circumstances.

LIST OF DRAWINGS

Figure 3:
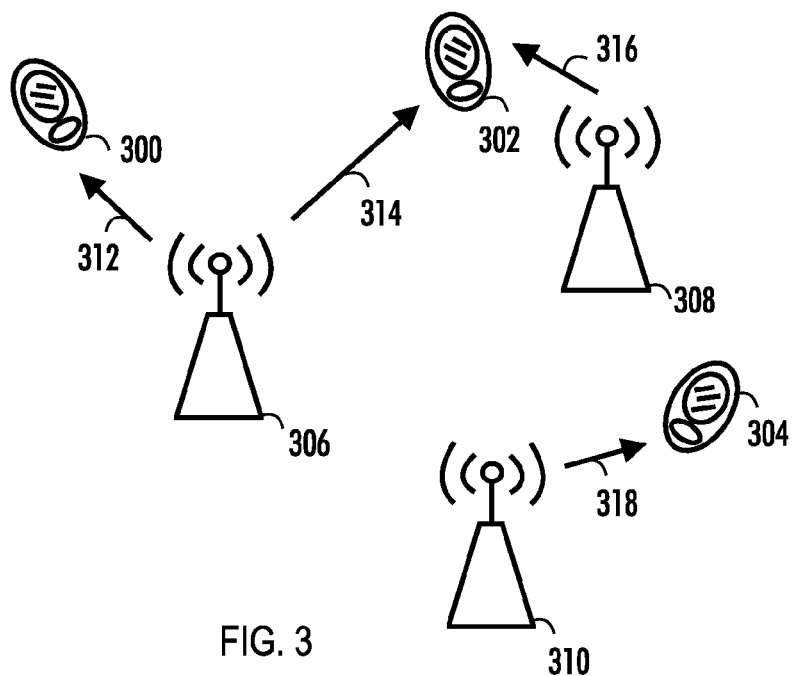
Figure 4:
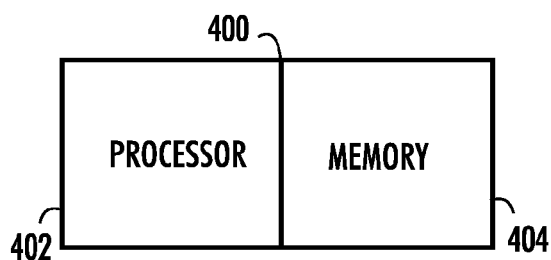
Figure 2:
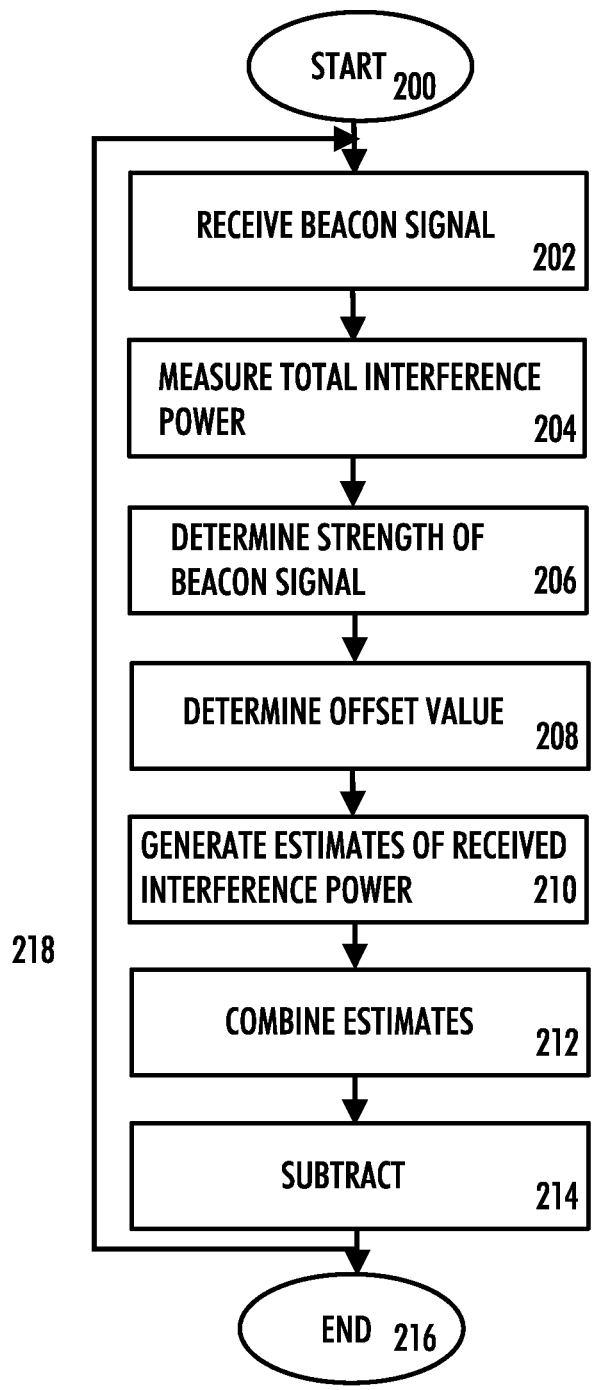
Figure 5:
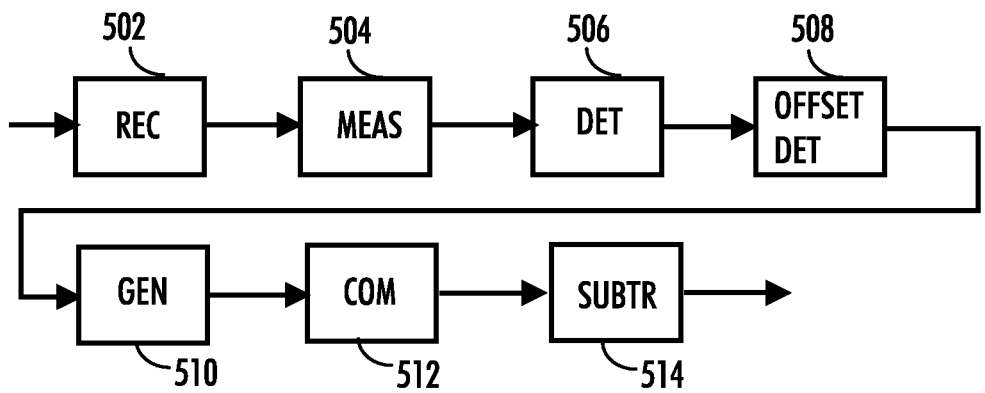
Figure 6:
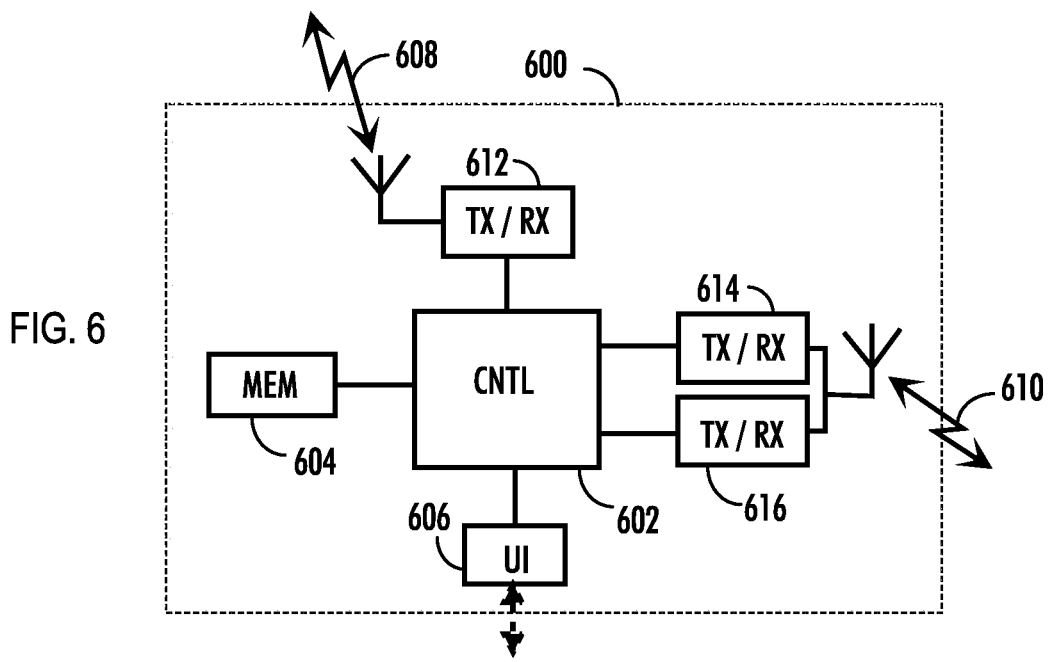

Embodiments of the present invention are described below, by way of example only, with reference to the accompanying drawings, in which FIG. 1 illustrates an example of a communication system, FIG. 2 is a flow chart; and FIG. 3 illustrates another example of a communication system, FIG. 4 illustrates an example of an apparatus, FIG. 5 illustrates another example of an apparatus, and FIG. 6 illustrates yet another example of an apparatus.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user terminal, server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

In wireless communication, in principle, users which typically are operators (or customers of the operators) have to obtain dedicated radio spectrum resources from national regulators. The radio spectrum resource may be utilized independently by each operator without interference coordination. Moreover, the operator is typically not allowed to use another operator's dedicated spectrum even when that is not utilized. In this case, the spectrum efficiency is not maximized and the peak data-rate is reduced due to limited bandwidth dedicated to each operator. However, since the radio spectrum is a limited natural resource, independent radio systems, such as military radars, broadcasters, cellular radio systems, and/or independent operators or users may share the same radio spectrum, and since the usage of wireless communication is increasing, the more efficient usage of radio spectrum becomes more and more important.

In future communication networks, devices are able to use the spectrum in an intelligent self-organizing flexible manner by adapting their operation to the current situation by sensing the environment or based on pre-defined resource sharing policies, for instance.

Cognitive radio is viewed as an approach to improve the utilization of the radio spectrum by providing a spectrum sharing scheme. The cognitive radio, which is typically built on a software-defined radio, may be defined as an intelligent wireless communication system that is aware of its environment and is able to learn from it and adapt to its statistical variations.

One basic concept behind the cognitive radio is a so called spectrum hole. A spectrum hole is a band of frequencies (or even only one frequency) allocated to a primary user but not used by that user in a particular time or geographic location. Spectrum utilization may be improved by enabling a secondary user to access such a spectrum hole. This requires cooperation techniques between primary and secondary users and/or between different secondary users.

In conventional wireless communications built around base stations or corresponding network devices, transmission power levels are usually controlled by these base stations in a centralized manner. But the principle of cognitive networks is operation in a decentralized manner. In such a network, some alternative means must be found for controlling transmission powers. Thus cooperation mechanisms to enable multiple access to such a network have to be developed. The cooperation mechanisms may include etiquette or protocol for cooperative ad hoc networks wherein users communicate with each other without any fixed infrastructure. It is thus possible to use and share the spectrum in an efficient manner and even to use the currently available best channel.

Flexible spectrum use (FSU) within a radio access network offers a flexible way to adapt the network capacity to the spatial and temporal variations of the user distributions over the cell and network areas in view of local interference. FSU concept is designed to allocate radio spectrum to participating systems based on load measurements and prediction.

A distributed FSU scheme is based on creating and spreading local awareness in the network, which allows intelligent self-organizing flexible spectrum use. The principle may be implemented in practice by using access point (AP) beaconing, in which each access point broadcasts FSU beacons containing information on its spectrum use, priority etc. Terminals coupled to other nearby access points may then listen to these beacons and form an understanding of the local spectrum use at their location. Each terminal may report its findings to its own access point which then combines the information it receives from all its terminals to form local awareness of the spectrum use in the cell.

It is possible that the FSU scheme is deployed in an unlicensed spectrum or under influence of systems using it. In this case an assumption that all systems obey commonly accepted FSU rules cannot be made. Then interference coming from uncooperative systems has to be considered. Thus a device using the FSU scheme needs to recognize whether the interference it is suffering from originates from another FSU device or from an uncooperative device unaware and not participating to FSU.

As interference originating from uncooperative devices cannot be handled by means of FSU rules or negotiation, it is beneficial to find means to recognize it. The recognition enables devices to follow different procedures for different kinds of interference. As an example, FSU devices can avoid using those spectrum resources that suffer from significant amount of uncooperative interference.

The knowledge of source transmitters of interference (FSU or not) enables identifying the worst FSU interferers and starting FSU negotiations with them to moderate the interference they generate.

In the following, an embodiment of a method for identifying the nature of a device (cooperative/non-cooperative, possibly opportunistic) which is the source of interference is presented. Furthermore, the magnitude of interference coming from each source can be estimated which is useful information when a partner device for FSU negotiations are chosen.

In the following, different embodiments will be described using, as an example of a system architecture whereto the embodiments may be applied, an architecture based on Evolved UMTS terrestrial radio access (E-UTRA, UMTS=Universal Mobile Telecommunications System or Long Term Evolution (LTE)) without restricting the embodiment to such an architecture, however.

Many different radio protocols to be used in communications systems exist. Some examples of different communication systems are the Universal Mobile Telecommunications System (UMTS) radio access network (UTRAN or E-UTRAN), Long Term Evolution (LTE, the same as E-UTRA), LTE-Advanced, Wireless Local Area Network (WLAN), Worldwide Interoperability for Microwave Access (WiMAX), Bluetooth®, Personal Communications Services (PCS) and systems using ultra-wideband (UWB) technology.

It should be appreciated that cognitive radio concept is not tied to certain radio standards or protocols. The network may be a cellular network or a non-cellular network, such as WLAN. It may even be applied to a network built on the usage of direct radio connections between user devices, such as radiotelephones. In the future, many networks are organized and built in such a manner that data is transferred as near the target as possible as is the principle in the Internet Protocol.

Additionally, cognitive radio concept can be applied not only in cooperative systems but also in opportunistic (non-cooperative) systems.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

FIG. 1 shows a part of a radio access network of E-UTRAN. E-UTRAN utilises Orthogonal Frequency Division Multiple Access (OFDMA) in downlink and Single Carrier Frequency Division Multiple Access (SC-FDMA) in uplink. The communications system is a cellular radio system which comprises a base station (or eNode B) 100, which has bi-directional radio links 102 and 104 to user devices 106 and 108. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia device, personal digital assistant (PDA), handset.

The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching center (MSC), a media gateway (MGW) or a serving GPRS (general packet radio service) support node (SGSN), etc.

It should be noted that in future radio networks, the functionality of an RNC may be distributed among (possibly a subset of) base stations. This is the case for instance in LTE there an eNode B may include the functionality of both a base station and a radio network controller. Thus the radio network controllers and base stations are depicted as parts of a same block in FIG. 1. It is obvious for a person skilled in the art that the system may comprise more eNode Bs and user devices (or core networks) than depicted in the FIG. 1.

The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

Next, an embodiment of a method will be described with reference to FIG. 2. The embodiment starts in block 200.

An embodiment of a method used in FSU operation when uncooperative interferes are present includes transmitting beacon messages for enabling signal strength measurements. Nearby FSU receivers are thus able to estimate interference power they receive from each beacon transmitter. It is thus possible to find out which resources suffer from notable interference originating from uncooperative systems.

In block 202, a beacon signal is received from at least one transmitter. The beacon signal comprises information relating to at least one of: transmission power and the at least one transmitter.

If a distributed FSU scheme is used, no dedicated FSU server designed for controlling resource management is provided. Then, typically, local awareness is created and spread in the network to enable intelligent self-organizing flexible spectrum use. In this case, access point beaconing may be introduced. In access point beaconing, each access point broadcasts FSU beacons containing information on its spectrum use, priority etc. Terminals operationally coupled to other nearby access points may then listen to these beacons and form an understanding of the local spectrum use at their location. Each terminal may report its findings to its own access point which then combines the information it receives from all its terminals to form local awareness of the spectrum use in the cell. A beacon signal may be implemented as broadcast messages which may be transmitted continuously or periodically.

FIG. 3 depicts an example of such a communication system. FIG. 3 depicts three user devices 300, 302 and 304 which are listening to beacons access points 306, 308 and 310 are broadcasting. The access points may be network devices such as eNode Bs, base stations etc. depending on the standard used. Signal 312, 314, 316 and 318 represent some beacon signals.

FSU transmitters may indicate with beacon messages which FSU resources they are currently using. Moreover, the beacons may support signal strength measurements by, for example, using a known reference signal. The transmission power information may include an average of used transmission power or current transmission power values. The transmission power may also be fixed by the system specification in which case the power information is not necessary in the beacon signal.

The receiver may store the information at least partly and update it when appropriate.

In block 204, total received interference power is measured. Many possibilities for measuring interference power exist and the embodiment does not restrict their use but the interference power may be measured in a normal way used in the systems. One example is using a spectrum analyzer. Parameters to be measured may for instance be total channel power or different kinds of error rates. The measurement results may be stored and/or averaged. It should be noticed that the total measured interference power includes also interference from uncooperative devices.

In block 206, strength of the received at least one beacon signal is determined. Signal strength is typically determined by measurements (based on known characteristics of a signal, such as pilot or training sequence). These measurements may also be carried out as a part of the receiver's normal operation, not necessarily as a separate function. The measurement results may be stored and/or averaged.

In block 208, at least one offset value is determined by using the information the at least one beacon signal comprises. The beacon signal may include a plurality of different pieces of information. For determining the offset, a beacon signal includes information relating to transmission power of an access point (possible varying on different resources) and information indicating resources reserved by the access point, for example, a beacon signal contains information indicating which resources are reserved and what is the used (average)

transmit power on those resources relative to the beacon power. The information may then be decoded from the received beacon signal.

In this application, difference between transmitted beacon power and transmission power of the reserved FSU resources (data transmission) is called offset. Similar power difference may be observed in the received signal strength. The offset describes difference between the transmission power of a beacon signal and the transmission power used in reserved resources. As received interference power is estimated based on a received beacon signal, some difference typically exists compared with transmission power of reserved resources. Moreover, only some of the resources available may transmit at a particular moment, which may be indicated in a beacon signal (e.g. information on such resources is included in the beacon signal). Alternatively, different resources may transmit different beacon signals. For instance, if a beacon signal contains information that it has 3 dB less power than a data transmission, the receiver may offset measured beacon strength by +3 dB to obtain estimate for the interference power on a data channel from that particular access point. Correspondingly, if a certain resource is not used by an access point (as can be noticed from beacon signal information), that resource does not suffer from interference caused by that access point (except possible adjacent channel interference).

In an embodiment, an offset is determined between the power of transmitted beacon signal and averaged transmission power of reserved FSU resources of the at least one transmitter.

The offset may also be determined for each FSU resource unit. Offset value determination may be carried out for all FSU transmitters known to the receiver that is to say whose beacons the receiver received.

In block 210, estimates of received interference power values are generated transmitter-wise by using the determined at least one offset value and the determined strength of the received at least one beacon signal. The received interference power may be estimated as separate values or as an average. Estimates may be generated by multiplying the determined strength of the received beacon signal with the offset value. The offset may represent the ratio of transmitted beacon signal power and averaged transmission power on FSU resources of an access point in question. The received interference power may be estimated not only transmitter-wise but also resource-wise. It should be understood that transmission power of some resources may be zero, if they are not reserved and transmitting.

In block 212, the transmitter-wise estimated received interference power values are combined for obtaining an estimated total received interference power. A plurality of manners to combine and average signals is provided.

In block 214, the estimated total received interference power is subtracted from the measured total received interference power for obtaining a residual interference power, the residual interference power originating from uncooperative devices.

The residual interference power defines difference between measured total interference and total interference cooperative transmitters produce. Thus interference produced by uncooperative transmitters can be found out.

The residual interference power is typically available for each FSU transmitter and even for each FSU resource separately.

An option for recognizing interference originating from uncooperative devices is to set a threshold for the residual interference, and if the residual interference exceeds the threshold, the FSU transmitter or resource unit is marked to suffer from uncooperative interference information on interference situation is conveyed to a serving access point. The worst FSU interferers may also be indentified by observing which FSU transmitter or access point has the highest average interference power on the resources used by the receiver. The threshold can be set once in the initiating phase or it may be updated regularly or irregularly. The threshold is typically obtained by simulating and/or measuring the operation of the network.

The obtained information may be either used directly at the receiver or the receiver may forward it to the access point serving the receiver, for instance.

The action to be performed based on the obtained information on interference originating from uncooperative devices depends on the details of the FSU scheme in use. In cases there only at least relatively small amount of interference originating from uncooperative devices exists, an FSU transmitter may operate normally. Otherwise, the FSU transmitter is typically able to operate and decide which of the terminals it is aware of may coexist with the uncooperative system. One example of possible actions is to refrain from using resources suffering from too high interference.

Furthermore, since resources that are interfered by uncooperative systems are identified, the receiver may perform measurements for identifying the type of the interfering system. It may even be possible to start negotiations which those systems to moderate the interference.

The embodiment ends in block 216. The embodiment is repeatable. One option for repetition is shown by arrow 218.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

An embodiment provides a computer program embodied on a computer readable medium, comprising program instructions which, when loaded into an electronic apparatus, constitute embodiments described above.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

FIGS. 4 and 5 are block diagrams of examples of apparatuses according to embodiments of the invention. Although the apparatuses have been depicted as one entity, different modules and memory may be implemented in one or more physical or logical entities.

An apparatus may be any node, host or server which is able to provide required functionality.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a multimedia device, a smartphone, a laptop (a notebook), a personal digital assistant, a mobile station (mobile phone), and a line telephone, etc.

The apparatus such as a node, or a corresponding component, or a user terminal, may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The apparatus may also be implemented as a microprocessor, such as single-chip computer element, including at least a memory for providing storage area used for arithmetic operation and an operation processor for executing the arithmetic operation. An example of the operation processor includes a central processing unit. The memory may be removable memory detachably coupled to the apparatus. An example of such an apparatus is depicted in FIG. 4.

The apparatus 400 comprises at least one processor 402 and at least one memory 404 including computer program code, the at least one memory and the computer program code configured to, with the at least one processor, cause the apparatus at least to perform: receive a beacon signal from at least one transmitter; measure total received interference power; determine strength of the received at least one beacon signal; determine at least one offset values by using the information the at least one beacon signal comprises; generate estimates of received interference power values transmitter-wise by using the determined at least one offset value and the determined strength of the received at least one beacon signal; combine the transmitter-wise estimated received interference power values for obtaining an estimated total received interference power; and subtract the estimated total received interference power from the measured total received interference power for obtaining a residual interference power, the residual interference power originating from uncooperative devices.

Another apparatus comprises a reception unit 502 configured to receive a beacon signal from at least one transmitter, a measurer 504 configured to measure total received interference power; a determinator 506 configured to determine strength of the received at least one beacon signal, and offset determinator 508 configured to determine at least one offset value by using the information the at least one beacon signal comprises, a generator 510 configured to generate estimates of received interference power values transmitter-wise by using the determined at least one offset value and the determined strength of the received at least one beacon signal, a combiner 512 configured to combine the transmitter-wise estimated received interference power values for obtaining an estimated total received interference power, and a subtractor 514 configured to subtract the estimated total received interference power from the measured total received interference power for obtaining a residual interference power, the residual interference power originating from uncooperative devices.

Yet another apparatus comprises means 502 for receiving a beacon signal from at least one transmitter, means 504 for measuring total received interference power, means 506 for determining strength of the received at least one beacon signal, means 508 for determining at least one offset value by using the information the at least one beacon signal comprises, means 510 for generating estimates of received interference power values transmitter-wise by using the determined at least one offset value and the determined strength of the received at least one beacon signal, means 512 for combining the transmitter-wise estimated received interference power values for obtaining an estimated total received interference power, and means 514 for subtracting the estimated total received interference power from the measured total received interference power for obtaining a residual interference power, the residual interference power originating from uncooperative devices.

An embodiment provides a computer program comprising program instructions which, when loaded into the apparatus, constitute the modules described above, such as determine at least one offset value by using the information the at least one beacon signal comprises, generate estimates of received interference power values transmitter-wise by using the determined at least one offset value and the determined strength of the received at least one beacon signal, combine the transmitter-wise estimated received interference power values for obtaining total received interference power and subtract the estimated total received interference power from the measured total received interference power for obtaining a residual interference power, the residual interference power originating from uncooperative devices. The computer program may further comprise program instructions for receiving a beacon signal from at least one transmitter, measuring total received interference power and determining strength of the received at least one beacon signal, or receive this information from other parts of the apparatus. In the latter case "receive" or "reception" means that the elsewhere physically received information or signal is conveyed to the computer program as input.

The computer program may be in source code form, object code form, or in some intermediate form, and it may be stored in some sort of carrier, which may be any entity or device capable of carrying the program. Such carriers include a record medium, computer memory, read-only memory and software distribution package, for example. Depending on the processing power needed, the computer program may be executed in a single electronic digital computer or it may be distributed amongst a number of computers.

It is obvious to a person skilled in the art that the apparatuses may include parts not depicted in examples of FIGS. 4 and 5. However, they are irrelevant to the embodiments and, therefore, they need not to be discussed in more detail here.

It should be appreciated that reception may mean that the apparatus includes a receiver or corresponding means, or it may as well mean that the apparatus is operationally coupled to a receiver of corresponding means. In the latter case "receive" or "reception" means that the elsewhere physically received information or signal is conveyed to the apparatus in question.

Next, a structure of a communication device whereto embodiments are applicable is depicted with reference to the simplified example of FIG. 6. The embodiments are not, however, restricted to the device given as an example but a person skilled in the art may apply the solution to other devices provided with the necessary properties.

The communication device may be a mobile phone, a computer, a laptop, or a PDA (Personal Digital Assistant), etc. It should be noticed that the communication device may also provide characteristics of several devices, such as a computer capable to offer wireless data or speech transfer services.

The communication device of the example includes a plurality of communication interfaces 612 to 616 to provide wireless radio connections 608, 610 to other devices, such as base stations. The communication interfaces typically include at least one transceiver. The communication interfaces 612 to 616 usually provide connections employing different radio access technologies. It is obvious to a person skilled in the art that the number of communication interfaces may vary from one implementation to another. There might even be only one such a connection.

The communication device further includes a control unit 602 to control functions of the device 600. The control unit 602 comprises means for creating radio connections between the communication device 600 and other communication devices or networks. The control unit may be configured to perform at least partly embodiments described above. Briefly, the control unit of the example may determine at least one offset value by using the information the at least one beacon signal comprises, generate estimates of received interference power values transmitter-wise by using the determined at least one offset value and the determined strength of the received at least one beacon signal, combine the transmitter-wise estimated received interference power values for obtaining total received interference power, and subtract the estimated total received interference power from the measured total received interference power for obtaining a residual interference power, the residual interference power originating from uncooperative devices. Further, the control unit may receive a beacon signal from at least one transmitter, measure total received interference power and determine strength of the received at least one beacon signal, or receive all or some of these from another unit/units. In the latter case "receive" or "reception" means that the elsewhere physically received information or signal is conveyed to the control unit.

The control unit 602 may be implemented in various ways, such as with a digital signal processor with suitable software or with separate logic circuits, for example with ASIC (Application Specific Integrated Circuit). The control unit 602 may also be a combination of these two implementations, such as a processor with suitable software embedded within an ASIC.

The communication device typically comprises a memory unit 604 for storing the determined strength of the received at least one beacon signal.

The communication device 600 further comprises a user interface 606 connected to the controlling unit. The user interface 606 may comprise a keyboard, a microphone, a loudspeaker, a display, and/or a camera. It is obvious to a person skilled in the art that the communication device may include parts, such as a battery, not depicted in FIG. 6.

Embodiments may be implemented in a system, such as a communication system. The system example comprises at least one access point configured to receive a beacon signal from at least one transmitter, measure total received interference power, determine strength of the received at least one beacon signal, determine at least one offset value by using the information the at least one beacon signal comprises, generate estimates of received interference power values transmitter-wise by using the determined at least one offset value and the determined strength of the received at least one beacon signal, combine the transmitter-wise estimated received interference power values for obtaining an estimated total received interference power, and subtract the estimated total received interference power from the measured total received interference power for obtaining a residual interference power, the residual interference power originating from uncooperative devices.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor; and
   at least one memory including computer program code;
   the at least one memory and the computer program code configured to, with the at least one processor, cause the apparatus at least to perform:
   receive a beacon signal from at least one transmitter;
   measure total received interference power;
   determine strength of the received at least one beacon signal;
   determine at least one offset value by using the information the at least one beacon signal comprises;
   generate the estimates of received interference power values transmitter-wise by using the determined at least one offset value;
   generate estimates of received interference power values transmitter-wise by using the determined strength of the received at least one beacon signal, wherein the estimates of received interference power values correspond to interference received at the apparatus;
   combine the transmitter-wise estimated received interference power values for obtaining an estimated total received interference power; and
   subtract the estimated total received interference power from the measured total received interference power for obtaining a residual interference power, the residual interference power originating from uncooperative devices.

2. The apparatus of claim 1, wherein the beacon signal comprises information relating to at least one of: transmission power and the at least one transmitter.

3. The apparatus of claim 1, wherein the offset is determined between a power of the transmitted beacon signal and an averaged transmission power of reserved resources of the at least one transmitter.

4. The apparatus of claim 1, wherein the residual interference power is determined for each of a plurality of resource units.

5. The apparatus of claim 4, wherein the at least one memory and the computer program code are further configured to, with the at least one processor, cause the apparatus to perform:
  determine an indication which of the plurality of resource units are being used using the information the at least one beacon signal comprises;
  wherein the residual interference power is further determined for each of the plurality of resource units by using said indication.

6. The apparatus of claim 1, wherein the at least one memory and the computer program code are further configured to, with the at least one processor, cause the apparatus to perform:
  recognize interference originating from uncooperative devices by comparing the residual interference with a predetermined threshold, and if the residual interference exceeds the threshold, information on interference situation is conveyed to a serving access point.

7. The apparatus of claim 1, wherein the at least one memory and the computer program code are further configured to, with the at least one processor, cause the apparatus to perform:
  recognize interference originating from uncooperative devices by comparing the residual interference in a resource unit with a predetermined threshold; and
  if the residual interference in a resource unit exceeds the threshold, marking the resource unit as suffering from uncooperative interference information.

8. The apparatus of claim 7, wherein the at least one memory and the computer program code are further configured to, with the at least one processor, cause the apparatus to perform:
  refrain from using resource units based on their marking as suffering from uncooperative interference information.

9. The apparatus of claim 1, wherein the at least one memory and the computer program code are further configured to, with the at least one processor, cause the apparatus to perform:
  initiate a negotiation for interference moderation with at least one transmitter in response to said at least one transmitter having the worst transmitter-wise estimate of received interference power value.

10. A method comprising:
  receiving at a receiver a beacon signal from at least one transmitter;
  measuring total received interference power;
  determining strength of the received at least one beacon signal;
  determining at least one offset value by using the information the at least one beacon signal comprises;
  generating the estimates of received interference power values transmitter-wise by using the determined at least one offset value;
  generating estimates of received interference power values transmitter-wise by using the determined strength of the received at least one beacon signal, wherein the estimates of received interference power values correspond to interference received at the receiver;
  combining the transmitter-wise estimated received interference power values for obtaining an estimated total received interference power; and
  subtracting the estimated total received interference power from the measured total received interference power for obtaining a residual interference power, the residual interference power originating from uncooperative devices.

11. The method of claim 10, wherein the beacon signal comprises information relating to at least one of: transmission power and the at least one transmitter.

12. The method of claim 10, further comprising:
  determining the offset value between a transmission power of the beacon signal and an averaged transmission power of reserved resources of the at least one transmitter.

13. The method of claim 10, further comprising:
  determining the residual interference power interference power for each of a plurality of resource units.

14. The method of claim 10, further comprising:
  recognizing interference originating from uncooperative devices by comparing the residual interference with a predetermined threshold.

15. The method of claim 14, further comprising:
  marking a resource unit as suffering from uncooperative interference information if the residual interference in a resource unit exceeds the threshold;
  refraining from using resource units based on their marking as suffering from uncooperative interference information.

16. A computer program embodied on a non-transitory computer readable medium, configured to control a processor to perform a method, the method comprising:
  receiving a beacon signal from at least one transmitter;
  measuring total received interference power;
  determining strength of the received at least one beacon signal;
  determining at least one offset value by using the information the at least one beacon signal comprises;
  generating the estimates of received interference power values transmitter-wise by using the determined at least one offset value;
  generating estimates of received interference power values transmitter-wise by using the determined strength of the received at least one beacon signal, wherein the estimates of received interference power values correspond to interference received at the processor;
  combining the transmitter-wise estimated received interference power values for obtaining an estimated total received interference power; and
  subtracting the estimated total received interference power from the measured total received interference power for obtaining a residual interference power, the residual interference power originating from uncooperative devices.

17. The computer program of claim 16, further comprising:
  marking a resource unit as suffering from uncooperative interference information if the residual interference in a resource unit exceeds a predetermined threshold.

* * * * *